(12) United States Patent
Kamiya

(10) Patent No.: US 10,133,067 B2
(45) Date of Patent: Nov. 20, 2018

(54) HEAD-UP DISPLAY APPARATUS

(71) Applicant: Shimadzu Corporation, Nakagyo-ku, Kyoto-shi, Kyoto (JP)

(72) Inventor: Naohiro Kamiya, Kyoto (JP)

(73) Assignee: Shimadzu Corporation, Nishinokyo-Kuwabaracho, Nakagyo-ku, Kyoto-shi, Kyoto (JP)

( * ) Notice: Subject to any disclaimer, the term of this patent is extended or adjusted under 35 U.S.C. 154(b) by 134 days.

(21) Appl. No.: 15/191,119

(22) Filed: Jun. 23, 2016

(65) Prior Publication Data

US 2017/0371155 A1 Dec. 28, 2017

(51) Int. Cl.
*G02B 27/01* (2006.01)
*B64D 43/00* (2006.01)

(52) U.S. Cl.
CPC .......... *G02B 27/0101* (2013.01); *B64D 43/00* (2013.01); *G02B 2027/0141* (2013.01); *G02B 2027/0165* (2013.01)

(58) Field of Classification Search
CPC ................................................. G02B 27/0101
USPC ........................................................ 359/633
See application file for complete search history.

(56) References Cited

U.S. PATENT DOCUMENTS

| 6,829,095 B2 | 12/2004 | Amitai |
| 2006/0215244 A1* | 9/2006 | Yosha ................ G02B 27/0101 359/15 |
| 2012/0002256 A1 | 1/2012 | Lacoste et al. |

FOREIGN PATENT DOCUMENTS

| JP | 2003-536102 | 12/2003 |
| JP | 2011-186332 | 9/2011 |
| WO | WO 2012/143701 A1 | 10/2012 |

OTHER PUBLICATIONS

Official Action in Related Application JP Patent Application No. 2013-261146, dated Jan. 24, 2017.

* cited by examiner

*Primary Examiner* — James Jones
(74) *Attorney, Agent, or Firm* — Muir Patent Law, PLLC

(57) ABSTRACT

A head-up display apparatus is provided with an image emission mechanism that emits image display light, and a combiner arranged in front of an eye (or eyes) of a pilot to introduce the image display light to the eye(s) of the pilot. The head-up display apparatus is equipped with a light guide including first and second plane arranged in parallel planes, an incidence plane including a first reflector and an emission plane including a second reflector disposed between the first and second planes. The light guide is configured to reflect image display light from the emission mechanism to the combiner.

18 Claims, 9 Drawing Sheets

HEAD-UP DISPLAY APPARATUS

The disclosure relates to a head-up display apparatus that provides an image as a virtual image, and more specifically to a head-up display apparatus that provides an image to a pilot, etc., of a small fixed-wing aircraft, a small or large commercial airplane, or a rotary-wing aircraft.

BACKGROUND

In moving transportations such as rotary-wing aircrafts and airplanes, symbol images on maneuvering information, mission information, etc., are provided as virtual images to a pilot by distantly displaying the symbol images superimposed with an external view. With this, the pilot can view the displayed contents (symbol images) at a true forward angle. As a result, the situation awareness can be improved, resulting in a reduced burden of maneuvering operations. In order to distantly display symbol images to the pilot as virtual images superimposed with the external scene, a head-up display apparatus (hereinafter also referred to as an "HUD apparatus") has been used. The symbol images are distantly displayed by providing the light forming the symbol images with substantially parallel light rays so that the symbol images appear to the pilot as a distant "object" (e.g., with the same focal plane that a pilot might view an external object distant from the plane).

FIG. 6 is a side view showing a schematic structure of an aircraft cockpit (pilot compartment) equipped with a conventional HUD apparatus. In this disclosure, a direction horizontal (in this figure) to the ground and extending between the front and back of the aircraft or other vehicle is denoted as an X-direction, a direction horizontal to the ground and perpendicular to the X-direction is denoted as a Y-direction (a right-left direction with respect to aircraft/vehicle movement), and a direction perpendicular to the X-direction and the Y-direction is denoted as a Z-direction (up-down direction). The aircraft cockpit 101 is provided with a seat 12 to be occupied by a pilot P, a hemispherical glass windshield 11 surrounding the periphery of the head portion of the pilot P, instruments (not illustrated) arranged below and in front of the pilot P, and an HUD apparatus 120.

The instruments include a plurality of compact (e.g., 30 cm²) instrument panels. For example, a first instrument panel displays latitude information, a second instrument panel displays longitude information, and a third instrument panel displays altitude information. These instruments are arranged, for example, around the HUD apparatus 120.

The HUD apparatus 120 is provided with a combiner 21 arranged in front of a pilot P and a housing 130 arranged in lower front of the pilot P. The housing 130 houses an ultra-high luminance CRT 131 which creates symbol images, a collimating lens system 132, and a reflecting mirror 133. The combiner 21 is constituted by two plate-shaped members 21a and 21b each comprising a partial reflector to combine the light of received through the windshield 11 and light emitted from the collimating lens system 132. These two plate-shaped members 21a and 21b are arranged at a predetermined angle with respect to the Z-direction.

According to such HUD apparatus 120, the symbol image displayed on the ultra-high luminance CRT 131 is converted into approximately parallel light (which is equivalent to light rays Lo transmitted from a distance) via the collimating lens system 132 and the reflecting mirror 133, and reflected by the reflection plane of the combiner 21 to become symbol light Ls to viewable by the pilot P. The external light Lo transmitted through the windshield 11 and the combiner 21 is also viewable by the pilot P. Since the external light Lo is light from afar, the pilot P can simultaneously visually recognize both the external light Lo and the symbol light Ls without refocusing the eyes E.

However, aforementioned HUD apparatus 120 is large, and miniaturization is desirable, especially in a cockpit of an aircraft. As such, an HUD apparatus using a light guide in which a hologram is formed (for example, see JP-H07-502001 A), an HUD apparatus using a light guide in which a grating is formed (for example, see U.S. Pat. No. 4,711,512), an HUD apparatus using a light guide in which a polarization selective reflection film is formed (for example, see U.S. Application Publication 2012/0002256), etc., have been developed.

Additionally, a spectacles-type display has been developed (for example, see JP2003-536102). FIG. 7 is an external view showing a spectacles-type display to be worn by an observer, and FIG. 8 is an optical path diagram on an X-Y plane. The spectacles type display 150 has an appearance similar to spectacles, and includes a unit portion U that emits image display light Ls, a light guide 160 which is a plate member that leads the image display light Ls from the unit portion U to eyes E of an observer while reflecting the light inside, and a frame portion F to which the unit portion U and the light guide 160 are attached. The unit portion U includes a liquid crystal panel 171 and a collimating lens system (emission mechanism) 172.

The light guide 160 is, for example, a glass plane plate, and includes a planar mirror 161 formed at one end and arranged in front of the unit portion U, reflectors 162 formed at the other end and arranged in front of an eye E of an observer, and side planes 163 formed at the interface with the air and between the planar mirror 161 and the reflector 162. The side plane 163 is a rectangular shape as seen in the Y-direction, and includes a first plane 163a, a second plane 163b opposed to the first plane 163a in the X-direction, a third plane (not illustrated), and a fourth plane (not illustrated) opposed to the third plane in the Z-direction.

The reflectors 162 include a first reflector 162a of a planar shape, a second reflector 162b of a planar shape, and a third reflector 162c of a planar shape. In the −Y-direction, the first reflector 162a, the second reflector 162b, and the third reflector 162c are arranged in this order. Further, the first reflector 162a, the second reflector 162b, and the third reflector 162c are arranged so that the angle of the first reflector 162a with respect to the −Y-direction, the angle of the second reflector 162b with respect to the −Y-direction, and the angle of the third reflector 162c with respect to the −Y-direction are the same angle α (for example 24 degrees) as seen in the Z-direction. The first reflector 162a, the second reflector 162b, and the third reflector 162c each are not a plane having a reflectance of 1, but a beam splitter surface capable of partially reflecting the incident image display light Ls and partially transmitting the image display light Ls.

Such a light guide 160 is generally produced by laminating plate members each having a half mirror coated surface, cutting the laminated plate members in the oblique direction into a plate shape. It is known that the performance of the light guide 160 is decided by the parallelism of the reflectors 162a to 162c and the parallelism of the first plane 163a and the second plane 163b formed by cutting.

In the spectacles type display 150, the symbol image displayed on the liquid crystal panel is converted into approximately parallel light via the collimating lens system 172 and is incident to the light guide 160. After being reflected by the planar mirror 161, the symbol image travels as light rays in a zig-zag manner while being totally reflected by the first plane 163a and the second plane 163b. The light rays are partially reflected every time when incident to each of the reflectors 162a to 162c. When reached the first plane 163a, the light rays are taken out outside as parallel light rays since the total reflection condition is not satisfied and become visually recognizable by an observer.

Instruments provided in a conventional aircraft cockpit 101 are often constituted by a plurality of small instrument panels due to limitations of space. However, in recent years, a so-called "big-picture" configuration constituted by a single large display panel (display panel having a large area) is becoming popular, making space in the cockpit even more valuable and difficult to fit in equipment as desired. In an aircraft cockpit equipped with a "big-picture" display panel, use of a larger light guide (similar to 160 described above, but its size is, e.g., 20 cm+30 cm+2 cm) has been attempted. FIG. 3 is a side view showing a general structure of an aircraft cockpit equipped with an HUD apparatus using a light guide. The aircraft cockpit 201 is provided with a seat 12 to be occupied by a pilot P, a glass windshield 11 surrounding the periphery of a head portion of the pilot P, a display panel (instrument) 40 arranged in lower front of the pilot P, and an HUD apparatus (not illustrated).

The display panel 40 includes a display surface having a large area (e.g., 1,000 cm$^2$) on which various information (e.g., latitude information and altitude information) is displayed. The display panel 40 is arranged on the rear wall of the housing 30. The display panel 40 may be arranged vertically.

As shown in FIG. 3, the light guide 260 is arranged at a position closer to the pilot P (−X-direction) so as to fit the light guide 260 into the cockpit in view of the space constraints imposed by the glass windshield 11. As shown in FIG. 3, arranging the light guide 260 in this fashion causes the light guide panel 260 to obstruct the view of the display panel 40 by the pilot P.

When arranging the light guide 360 so as not to be arranged to obstruct the view of the display panel 40, the windshield or other portions of the cockpit interfere with positioning the light guide 360 as shown in FIG. 4. If the light guide 360 is reduced in size to avoid contact with the windshield 11, the visual angle θ of the light guide 360 as seen from the pilot P (the instantaneous field of view or IFOV) decreases. In order to avoid the interference of a larger light guide with the windshield while still avoiding obstruction of the display 40, one may consider inclining the light guide 460 as shown by FIG. 5. However, in order to incline the light guide 460, it is required to reduce the inclination angle a of the reflector in the light guide 460, which causes cracks in the reflector during the manufacturing process.

SUMMARY

The disclosed embodiments comprise a display apparatus, that may be used as an HUD apparatus in an aircraft cockpit equipped with a so-called "big-picture" display panel. The disclosed embodiments may comprise both a light guide and a combiner.

Some examples comprise a display (an emission mechanism) that emits image display light, and a combiner arranged in front of the eyes of a pilot to project the image display light to the eyes of the pilot. The head-up display apparatus may equipped with a light guide including a first plane, a second plane opposite the first plane, a reflector, configured to reflect image display light from the emission mechanism to the combiner and to be emitted by the combiner in a set direction.

The "set direction" is referred to as any one direction previously set by a designer or the like, for example, a front-back direction.

In some examples, the image display light emitted from the emission mechanism is initially directed into the inside of the light guide. After being reflected by an incidence plane within the light guide, the image display light travels as light rays in a zig-zag manner toward a reflector of the light guide, by being totally internally reflected by a first plane and a second plane. When the light rays are incident to the reflector, the light rays may be partially reflected by the reflector, and when the light rays reach the first plane at a location above the incidence plane, at least some of the light rays are emitted outside of the light guide as parallel light rays (since the angle of the light rays and the first plane does not meet the total reflection condition) and reaches the combiner. Thus, the light rays forming the symbol image are reflected by the reflection plane and becomes visible to a pilot. In the disclosed head-up display apparatus, the image display light from the light guide need not be directly introduced to an eye of a pilot.

It is thus is possible to eliminate a protrusion with respect to instruments, etc., while keeping a visual angle a similar to that of a conventional head-up display apparatus, which can provide a space for mounting a large display.

Further, the light guide may be arranged below the combiner with the larger first and second planes arranged horizontally, to thereby provide space below the light guide, which enables arrangement of a large display panel below the light guide.

In some examples, the reflector of the light guide is constituted by a plurality of flat-shaped beam splitters (or partial reflectors) capable of reflecting light rays of the incident image display light at a set ratio or percentage and transmitting the light rays of the image display at a set ratio or percentage. The beam splitter surfaces may be parallel to each other and inclined at a set angle with respect to surfaces of the first plane and the second plane.

Here, the aforementioned "set ratio" denotes a fixed ratio (e.g., previously determined by a designer or the like), for example 20%, and may differ between each beam splitter (e.g., to reflect more light and transmit less light as a beam splitter is further away from light source input of the light guide) to obtain a constant brightness of the display image. Further, the aforementioned "set direction" denotes any one direction previously set by a designer or the like, for example, a front-back direction.

According to the head-up display apparatus of the present invention, the light guide can be readily arrange in a cockpit, and can be used together without interfering with other instruments.

DETAILED DESCRIPTION

In the following paragraphs, some preferred embodiments of the invention will be described by way of example and not limitation. It should be understood based on this disclosure that various other modifications can be made by those in the art based on these illustrated embodiments.

Hereinafter, embodiments of the present invention will be described with reference to drawings. It should be noted that the present invention is not limited to the embodiments described below and includes various embodiment within a range not deviating from the gist of the present invention.

Figure 1:
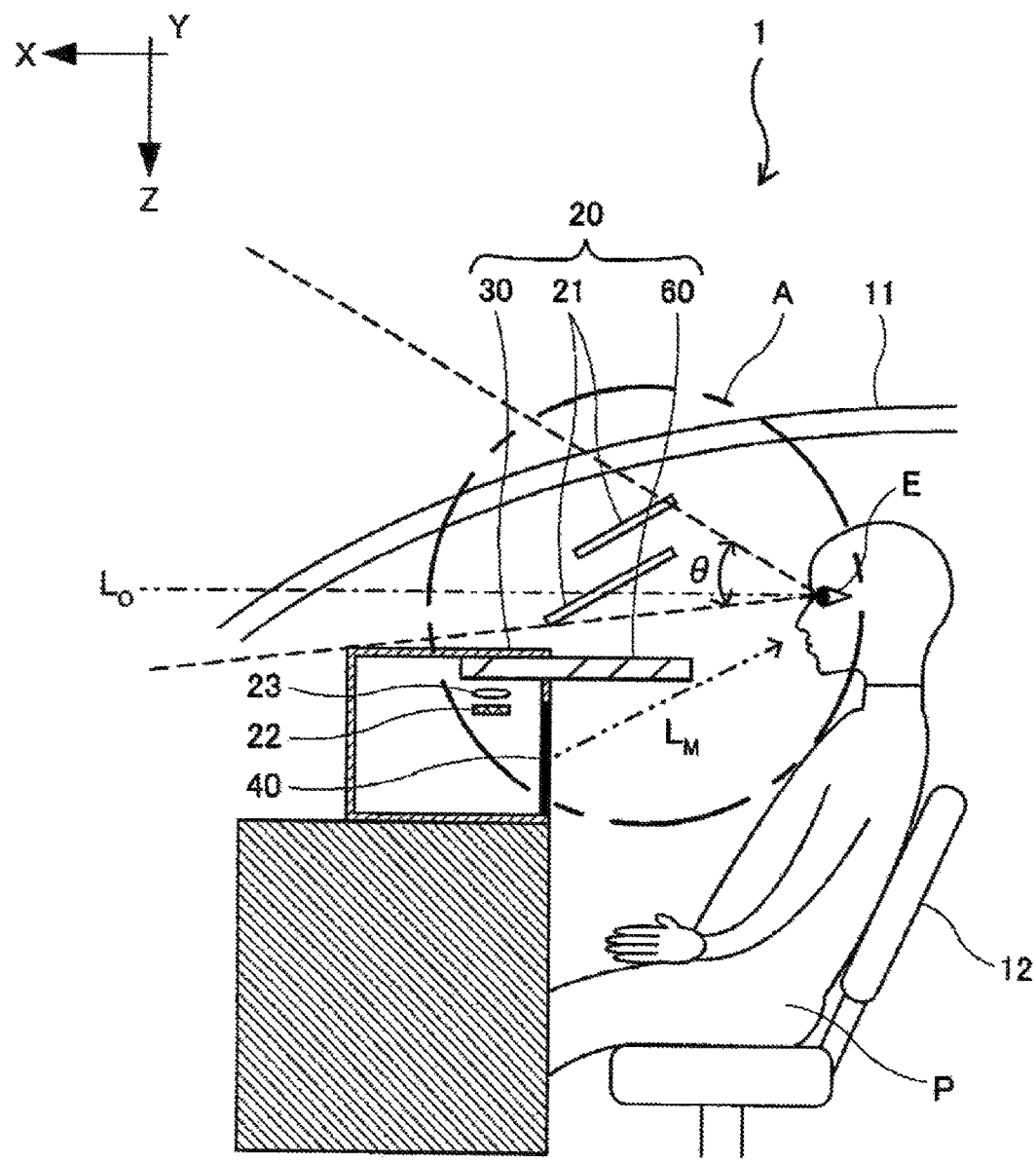
FIG. 1 is a side view showing a general schematic structure of an aircraft cockpit equipped with an HUD apparatus according to an embodiment of the present invention.
Figure 2:
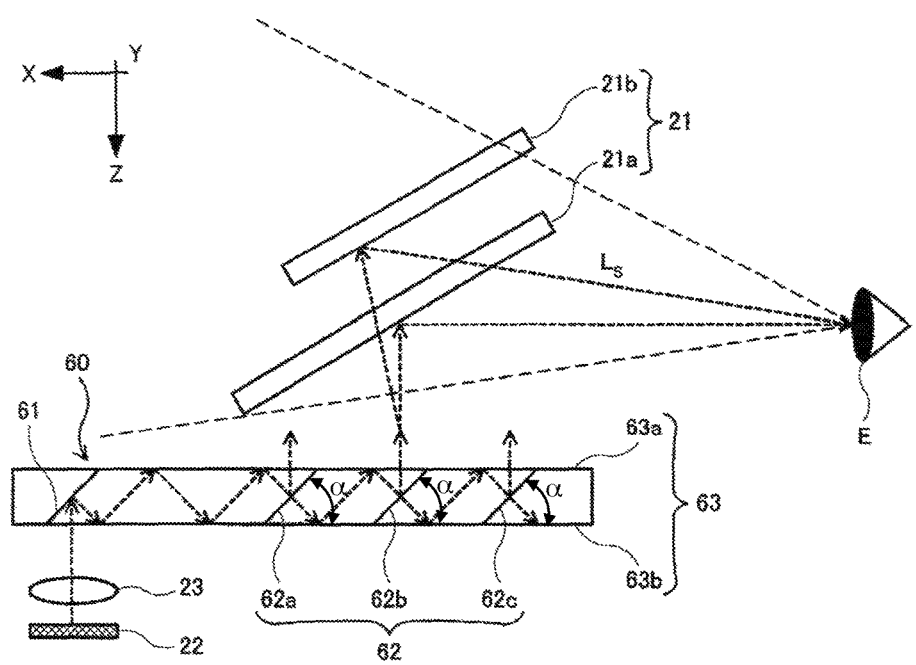
FIG. 2 is an enlarged principal view of FIG. 1.
Figure 3:
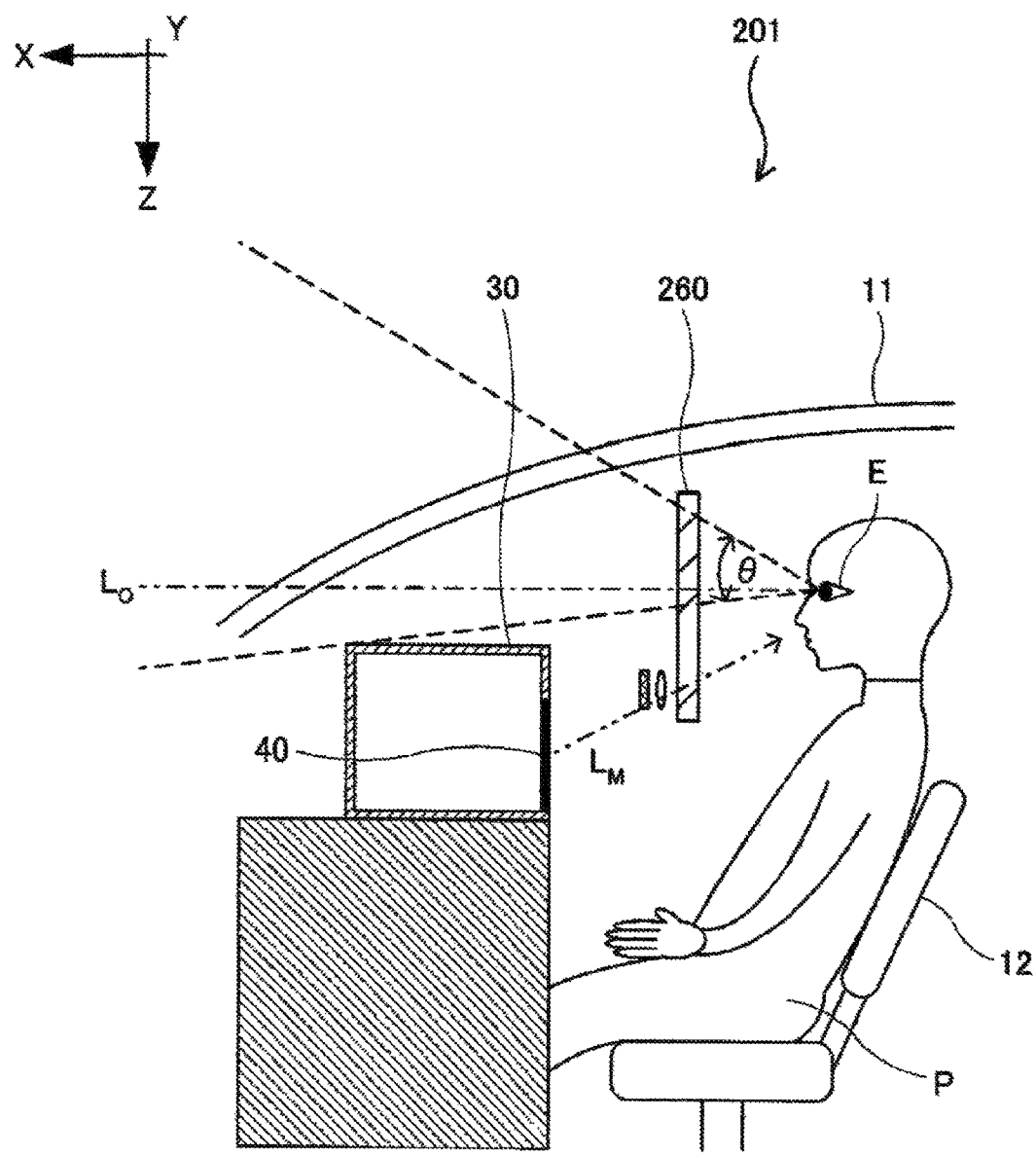
FIG. 3 is a side view showing a general schematic structure of an aircraft cockpit equipped with an HUD apparatus using a light guide arranged near a pilot.
Figure 4:
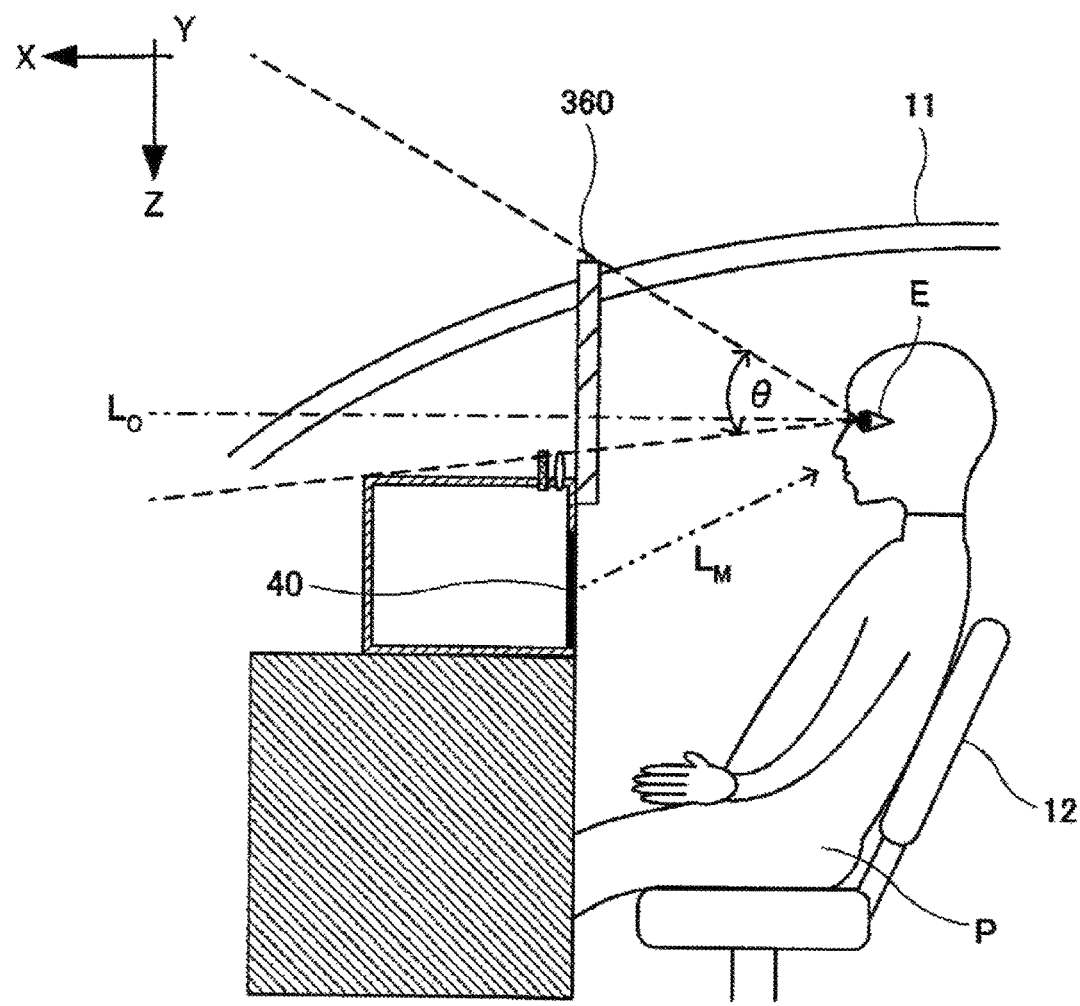
FIG. 4 is a side view showing a general schematic structure of an aircraft cockpit equipped with an HUD apparatus using a light guide arranged near a display panel.
Figure 5:
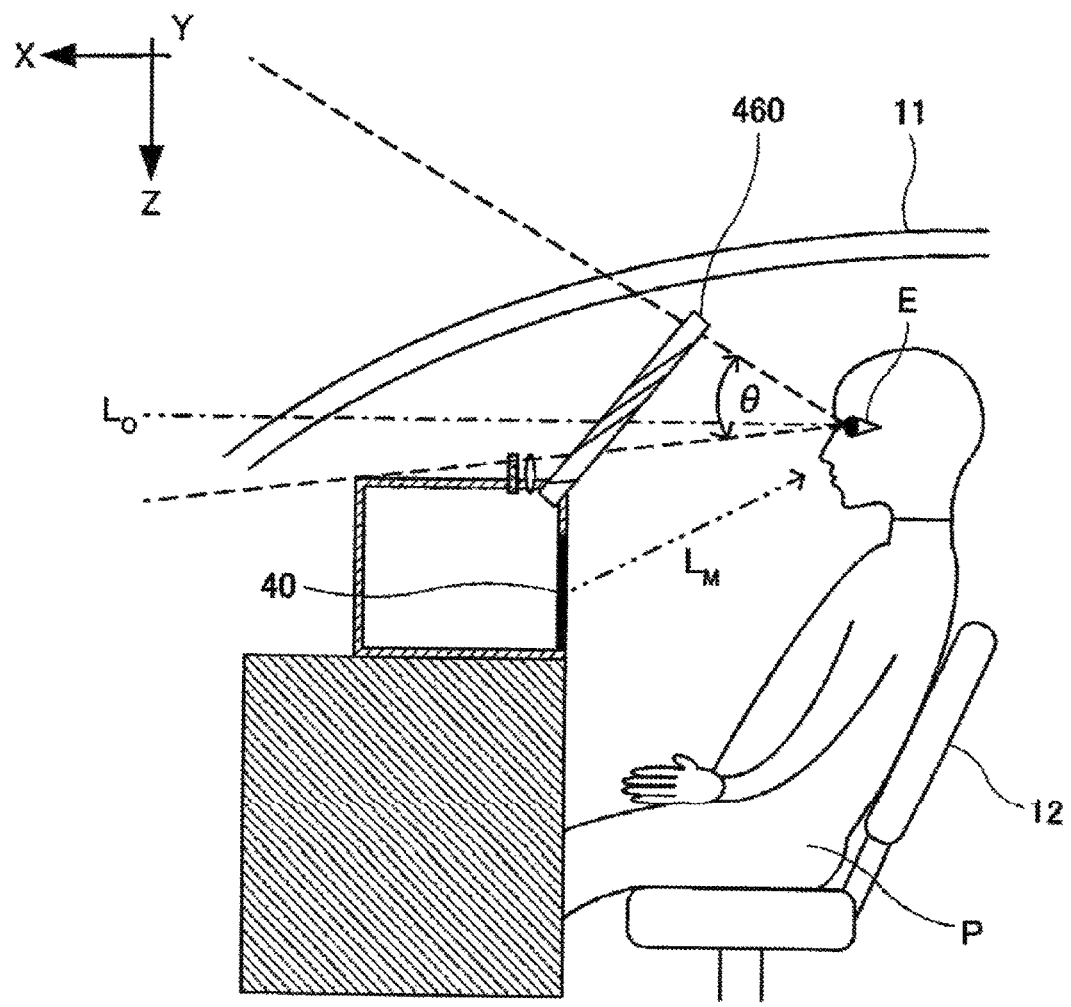
FIG. 5 is a side view showing a general schematic structure of an aircraft cockpit equipped with an HUD apparatus using a light guide arranged in an inclined manner.
Figure 6:
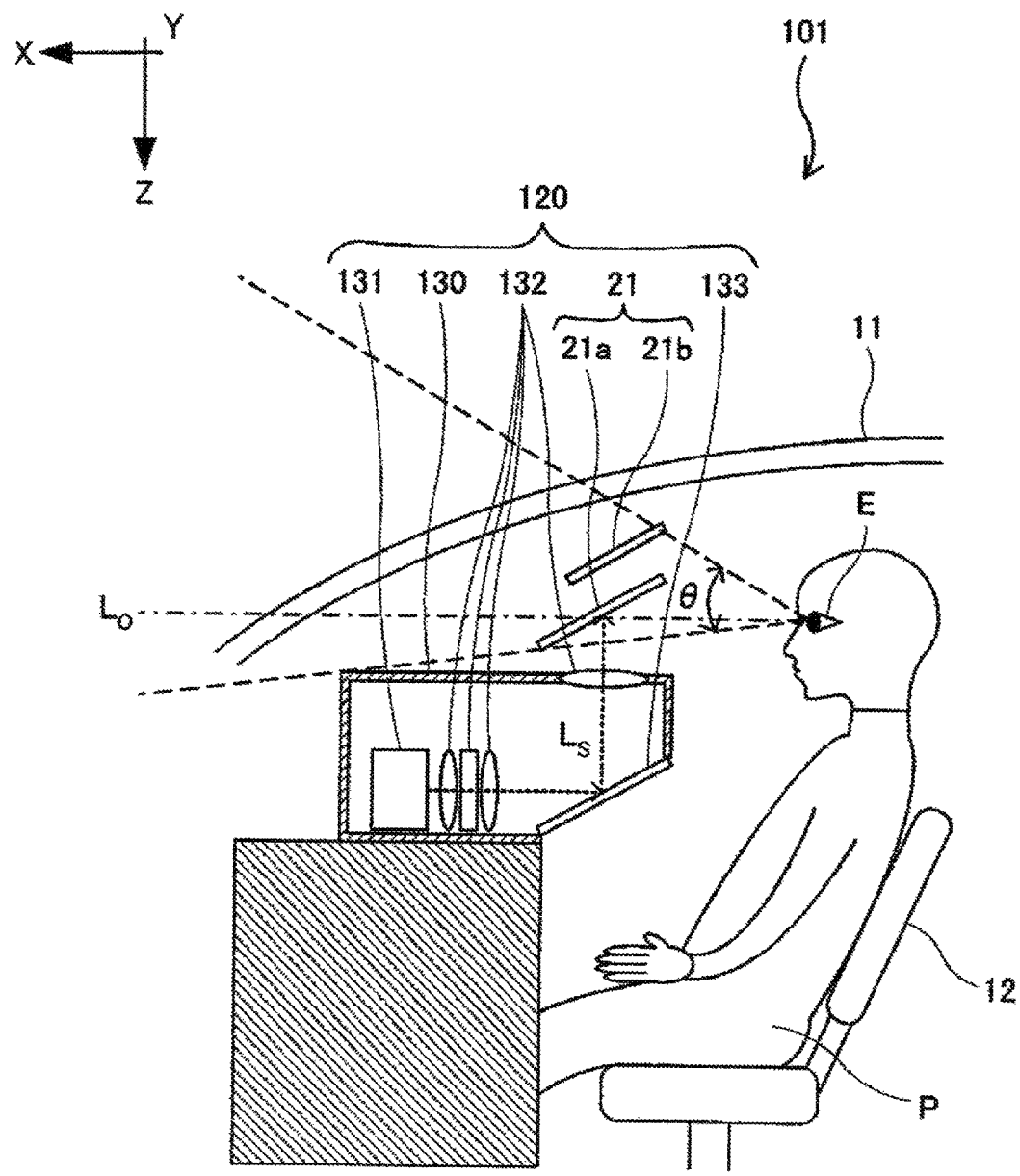
FIG. 6 is a side view showing a schematic structure of an aircraft cockpit equipped with a conventional HUD apparatus.
Figure 7:
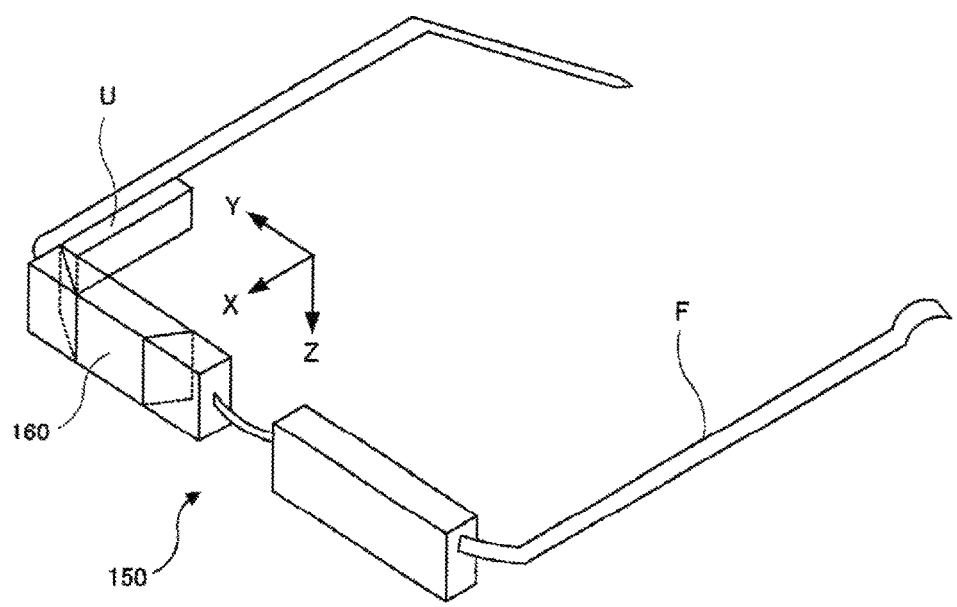
FIG. 7 is an external view showing a spectacles type display to be worn by an observer.
Figure 8:
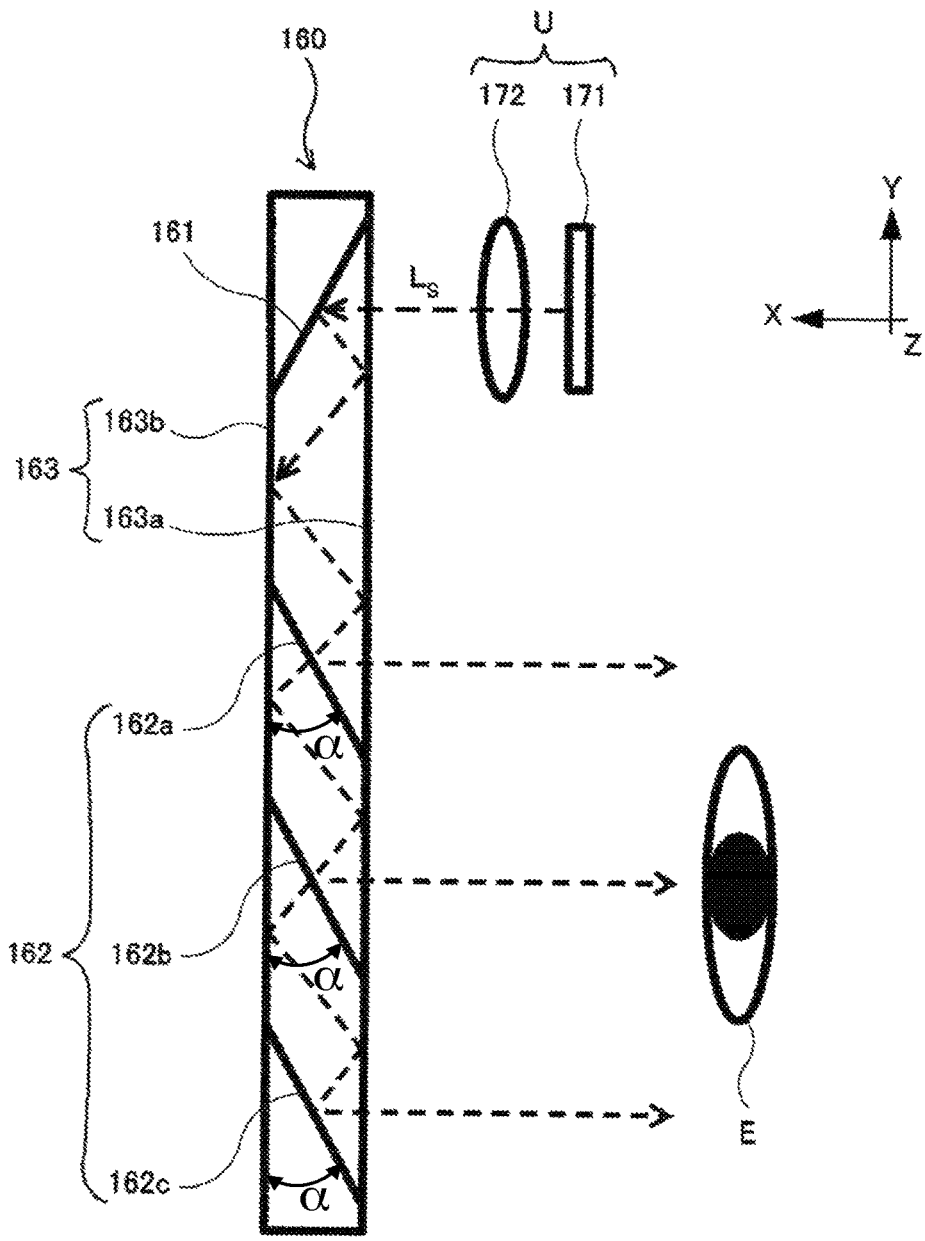
FIG. 8 is an optical path diagram on an X-Y plane.

FIG. 1 is a side view showing a general schematic structure of an aircraft cockpit equipped with an HUD apparatus according to the present invention. Further, FIG. 2 is an enlarged view of the portion indicated by the symbol A in FIG. 1. As to the portions similar to those of the aircraft cockpit 101 described above, the same symbol is allotted.

The aircraft cockpit 1 is equipped with a seat 12 to be occupied by a pilot P, a hemispherical glass windshield 11 surrounding a periphery of a head portion of the pilot P, a display panel (instrument) 40 arranged in lower front of the pilot P, and an HUD apparatus 20.

The display panel 40 may have a display plane having a large area (e.g., 1,000 cm$^2$). The display plane displays, for example, latitude information and longitude information. The display panel 40 is arranged on a rear wall of the housing 30. The display panel 40 is arranged approximately perpendicular to the horizontal plane. In some examples, the top of the display panel 40 may be at least as high as the chest of the pilot in a sitting position or at least as high as the neck of the pilot in a sitting position (e.g., higher than 1 meter, higher than 1.1 meters or higher than 1.2 meters) while still positioned for an unobstructed view by the pilot when seated in seat 12.

The HUD apparatus 20 is provided with a combiner 21 arranged in front of the pilot P, and a housing 30 arrange in lower front of the pilot P. The combiner may be one or more partial reflecting mirrors (two shown in FIGS. 1 and 2) that may allow transmission of external light received through the windshield 11 of the aircraft while reflecting light received from the light guide 60. A display (an emission mechanism) is formed within the housing 30 and comprises a liquid crystal display panel 22 which creates a symbol image, and a collimating lens system 23. The liquid crystal panel 22 may comprise a light source that is modulated by operation of an array of liquid crystal pixel elements as is known. Other types of displays may be formed within housing which emit a viewable image.

The light guide 60 may be made of solid glass having a flat, sheet-like shape (e.g., 20 cm+30 cm+2 cm). Here, the light guide 60 includes a planar mirror 61 formed at one end, a reflector 62 (comprised of reflectors 62a, 62b and 62c) formed on the other end and disposed between planes 63. Planes 63 are the outer planar surfaces of the light guide 60. As used herein, a "plane" refers to an external or internal surface of the light guide having a planar shape having a structure to guide light within the light guide (e.g., through reflection or refraction). "Planar" may include deviations from a true geometric plane, such as that resulting from expected manufacturing deviations. With the exception of the elements forming the planar mirror 61 and the reflector 62, the transparent material of the light guide 60 (e.g., glass) may extend continuously from one surface of the light guide 60 to an opposite surface of the light guide 60. For example, planes 63a and 63b may be planar outer surfaces of solid glass (the transparent material of the light guide 60) that extends continuously (with the exception of locations at planar mirror 61 and reflectors 62a, 62b and 62c) between planes 63a and 63b.

The side planes 63a and 63b each have a rectangular shape as seen in the Z-direction, and include a first plane 63a, a second plane 63b opposite to the first plane 63a in the Z-direction, a third plane (not illustrated), and a fourth plane (not illustrated) opposite to the third plane in the Y-direction. The first and second planes 63a and 63b may be fully reflective (e.g., not transmissive) for light rays received from the planar mirror 61, because of the Total Internal Reflection phenomenon. The plane 61 may be set at an angle so that it directs light received from the display (22, 23) to initially impinge on one of the planes 63a and 63b (in this example, 63b) with an angle of incidence (measured with respect to the normal of the refractive boundary and the direction of a light ray) above the critical angle $\theta_c$. The light reflected from plane 63b may be directed to 63a to impinge on 63a with an angle of incidence above the critical angle $\theta_c$. The critical angle $\theta_c$ of a refractive boundary (the boundary between materials having different indexes of refraction) differs for different materials. The critical angle $\theta_c$, is determined as $\arcsin(n_2/n_1)$ where $n_1$ is the refractive index of the light guide material (e.g., glass) and $n_2$ is the refractive index of air (the material adjacent planes 63a, 63b). When the transparent material of the light guide 60 is glass, the critical angle $\theta_c$, may be 41.8° or more. The spacing between planes 63a and 63b may dictate the vertical height of the light guide 60. Although the light guide 60 may transmit a wide image to achieve a large field of view, the vertical height of the light guide 60 may be made small (e.g., less than 5 cm or less than 2 cm) to provide space above and below the light guide 60.

Figure 9:
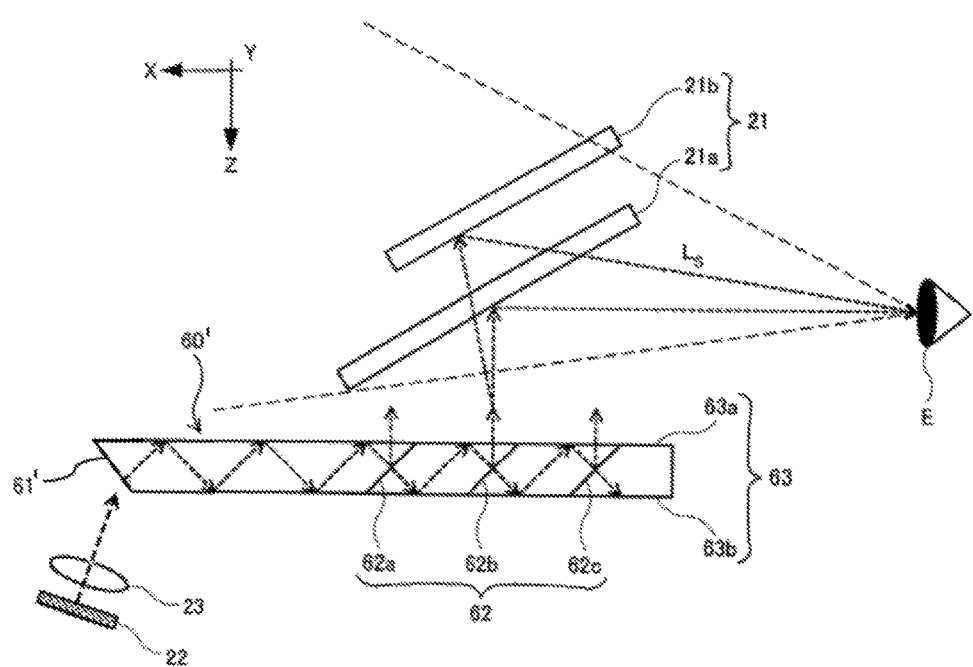
FIG. 9 is illustrates an alternative embodiment that may correspond to the enlarged principal view of FIG. 1.

In the example of FIG. 2, planar mirror 61 is a plane implemented as a mirror and reflects light received from the display (22, 23) towards reflector 62. In other examples, 61 may be a plane implemented as an outer surface (e.g., at an oblique angle with respect to the X-direction) of the transparent material of the light guide 60 positioned to refract light received from display (22, 23) towards reflector 62 via planes 63a and 63b as described herein. FIG. 9 shows one such example, where light guide 60' comprises a plane 61' that is an outer surface of the transparent material of the light guide 60' extending between planes 63a and 63b. When the light guide has a sheet like or plate shape of, e.g., 20 cm+30 cm+2 cm, the outer surface of plane 61' may extend 30 cm in the Y direction with plane 63a extending approximately 20 cm in the X direction (with plane 63b being slightly shorter as shown). Planes 63a and 63b may be spaced apart by 2 cm, e.g. Light emitted by display (22, 23) is directed to plane 61' and passes through plane 61' into the interior of the light guide. The light is then transmitted towards reflector 62 via planes 63a and 63b in a zig-zag manner by reflecting between planes 63a and 63b due to the Total Internal Reflection condition as described with respect to the embodiment of FIG. 2. Other elements and operation of FIG. 9 may be the same as described with respect to FIG. 2 and a repetitive description is therefore omitted. In the example of FIG. 9, the light rays of the image symbol emitted by display (22, 23) is refracted by plane 61' so that the direction of the light rays of image symbol is changed (here, the plane 61' is positioned as an oblique angle with respect to the direction of light rays of the image display light transmitted from the display). However, the direction of the rays of the image symbol light may impinge plane 61' in a direction perpendicular to the planar surface of plane 61' and enter the light guide 60' without changing their direction prior to being reflected by plane 63b.

The reflector 62 includes a first reflector 62a having a planar shape, a second reflector 62b having a planar shape, and a third reflector 62c having a planar shape. In the X-direction, the first reflector 62a, the second reflector 62b, and a third reflector 62c are arranged in this order. Further, the first reflector 62a, the second reflector 62b, and the third reflector 62c are arranged so that the angle of the first reflector 62a with respect to the −X-direction, the angle of the second reflector 62b with respect to the −X-direction, and the angle of the third reflector 62c with respect to the −X-direction are the same angle α (for example 24 degrees) as seen in the Y-direction.

Each of the first reflector 62a, the second reflector 62b, and the third reflector 62c are partial reflectors (and do not have a reflectance of 100%, but comprise a beam splitter that partially reflects the incident image display light Ls and partially transmits the image display light Ls.

The light guide 60 is arranged so that the first plane 63a and the second plane 63b are parallel to the X and Y directions (e.g., horizontal plane in this figure) and the first plane 63a is formed above the second plane 63b. Further, the planar mirror 61 formed at one end of the light guide 60 is positioned above (in the −Z-direction) the liquid crystal panel 22, and the reflector 62 formed at the other end of the light guide 60 is positioned below (−Z-direction) the combiner 21. Additional features and/or other configurations of the light guide 60 may be implemented, such as described in U.S. Pat. No. 6,829,095 which is hereby incorporated by reference in its entirety for these teachings.

According to the HUD apparatus 20, the symbol image displayed on the liquid crystal panel 22 is converted into approximately parallel light via the collimating lens system 23 and transmitted to the light guide 60. Thereafter, after being reflected by the planar mirror 61 in the light guide 60, light rays of the symbol image travel in a zig-zag manner to reflector 62 by being completely reflected by the first plane 63a and the second plane 63b, because these rays of the symbol image satisfy the Total Internal Reflection condition. When the light rays of the symbol image is incident to each of the reflectors 62a to 62c, the light rays of the symbol image is partially reflected, and when the light rays of the symbol image reaches the first plane 63a after being reflected by one or more of reflectors 62a to 62c, the light rays of the symbol image is transmitted through the plane 63a to the outside of the light guide 60 as parallel light rays since these light rays no longer satisfy the Total Internal Reflection condition with respect to their impingement on plane 63a, and are transmitted to the combiner 21. Upon transmission to and impinging combiner 21, the light rays of the symbol image (symbol light LS) are reflected by the combiner 21 and become viewable by a pilot. At the same time, the external light Lo from the external environment transmitted through the windshield 11 and the combiner 21 and is also viewable by a pilot P. External light Lo from objects located far away arrives as substantially parallel light rays. As both this external light Lo and the symbol light LS are transferred to the eye of the pilot as parallel light rays, the pilot P can simultaneously view both at the same focal condition of the eye E avoiding the need to refocus the eye E. On the other hand, the image display light LM emitted from the display panel 40 is introduced to the eye E of the pilot P without being obstruction by the light guide 60.

As explained above, according to the HUD apparatus 20, room below the light guide 60 may be made available while still providing the visual angle θ (field of view of the symbol image) similar to that of a conventional head-up display apparatus. Therefore, a large display panel 40 (such as a flat panel display, e.g., LCD flat panel) can be arranged below the light guide 60 to attain the so-called "big picture" configuration. Further, the light guide 60 can be readily arranged in the aircraft cockpit 1, and can be used together with the display panel 40 without obstructing a view of the display panel 40. While the invention has been described with respect to an aircraft, the display may be implemented in other systems, such as used within a land-based vehicles (e.g., car or truck), or used with non-mobile structures.

The invention claimed is:

1. A head-up display apparatus comprising:
a first display configured to emit image display light;
a light guide positioned to receive and guide the image display light emitted from the first display, the light guide including a first plane, a second plane opposite to and parallel to the first plane, and an emission plane positioned to reflect the image display light out of the light guide; and
a light beam combiner disposed between a windshield of a vehicle and a seat of an operator of the vehicle to reflect image display light received from the light guide towards the eyes of the operator and to transmit light transmitted through the windshield of the vehicle to the eyes of the operator to thereby superimpose an image formed by the image display light with an external view.

2. The head-up display apparatus as recited in claim 1, wherein the light guide is arranged below the combiner, and
wherein the first plane and the second plane are arranged substantially horizontally.

3. The head-up display apparatus as recited in claim 1, wherein the light guide includes a first reflector to reflect the image display light emitted from the first display into the light guide, and
wherein the emission plane of the light guide includes one or more flat-shaped partial reflectors arranged between the first and second planes to reflect a first portion of light rays of the image display light out of the light guide and to transmit a second portion of the image display light,
wherein the partial reflectors are arranged in parallel to each other, and each are inclined at a first angle with respect to the first plane and the second plane.

4. The head-up display apparatus as recited in claim 1, wherein the vehicle is an aircraft.

5. The head-up display apparatus as recited in claim 1, wherein the first plane and the second plane are spaced apart a distance of 5 cm or less.

6. The head-up display apparatus as recited in claim 1, wherein the first plane and the second plane are spaced apart a distance of 2 cm or less.

7. The head-up display apparatus as recited in claim 1, wherein the light guide comprises a third plane, extending between the first plane and the second plane at a first oblique angle.

8. The head-up display apparatus recited in claim 7, wherein the first oblique angle of the third plane directs the image display light received from the first display towards the emission plane by directing the image display light to impinge on one of the first plane and the second plane and be reflected to the other of the first plane and the second plane.

9. The head-up display apparatus recited in claim 8,
wherein the light guide comprises a solid transparent material extending between the first plane and the second plane,
wherein the first plane comprise a first planar outer surface of the solid transparent material and the second plane comprises a second planar outer surface of the solid transparent material, and
wherein the third plane directs the image display light received from the first display towards the emission plane by transmitting the image display light to reflect between the first plane and the second plane in a zig-zag manner due to a total internal reflection condition.

10. The head-up display apparatus recited in claim 8, wherein the third plane is internal to the light guide and forms a reflector to reflect the image display light received from the first display towards the emission plane.

11. The head-up display apparatus recited in claim 8, wherein the third plane comprises a third planar outer surface of the solid transparent material.

12. The head-up display apparatus recited in claim 11, wherein the third plane transmits the image display light received from the first display towards the emission plane.

13. The head-up display apparatus recited in claim 12, wherein the third plane is positioned as a second oblique angle with respect to the direction of light rays of the image display light received from the first display.

14. The head-up display apparatus of claim 12, wherein the first plane is above the second plane and wherein the first oblique angle of the third plane directs the image display light received from the display towards the emission plane by directing the image display light to first impinge on the first plane and be reflected to the second plane.

15. The head-up display apparatus of claim 8, wherein the first plane is below the second plane and wherein the first oblique angle of the third plane directs the image display light received from the first display towards the emission plane by directing the image display light to first impinge on the first plane and be reflected to the second plane.

16. The head-up display apparatus of claim 1,
wherein the light guide has a plate shape with the first plane and second plane forming major surfaces of the plate shape light guide, and
wherein the first and second plane lie in a horizontal direction.

17. The head-up display apparatus of claim 16, further comprising a second display, the second display being located below the light guide positioned to be viewable by the operator.

18. The head-up display apparatus of claim 17, wherein the second display is a flat panel display.

* * * * *